United States Patent

Bedkowski et al.

[11] Patent Number: 5,374,785
[45] Date of Patent: Dec. 20, 1994

[54] HUB LOCKNUT

[75] Inventors: Thomasz Bedkowski, Montreal; Marc Brodeur, Iberville, both of Canada

[73] Assignee: Thomas & Betts Corporation, Memphis, Tenn.

[21] Appl. No.: 9,182

[22] Filed: Jan. 26, 1993

[51] Int. Cl.$^5$ .............................................. H02G 3/18
[52] U.S. Cl. .................................. 174/65 R; 411/427
[58] Field of Search ................ 174/65 R, 65 SS; 411/427; 285/165

[56] References Cited

U.S. PATENT DOCUMENTS

| | | | |
|---|---|---|---|
| 3,079,182 | 2/1963 | Appleton | 285/343 |
| 3,368,443 | 2/1968 | Faul | 411/427 |
| 3,992,044 | 11/1976 | Muslin | 174/65 R |
| 4,022,966 | 5/1977 | Cajijiva | 174/65 |
| 4,225,162 | 9/1980 | Dola | 285/161 |
| 4,490,576 | 12/1984 | Bolante et al. | 174/65 |
| 4,515,991 | 5/1985 | Hutchison | 174/65 |
| 5,059,747 | 10/1991 | Bawa et al. | 174/65 |

*Primary Examiner*—Lincoln Donovan
*Attorney, Agent, or Firm*—Thomas & Betts Corporation

[57] ABSTRACT

An electrical connector is secured to the wall of an electrical enclosure. The connector includes a hub which permits passage of electrical conductors in a conduit into the enclosure. The hub includes an elongate body having a conduit receiving end and a conductor egressing end which extends through the wall of the enclosure. A hub locknut is attachable to the conductor egressing end of the hub on the opposite side of the wall to secure the hub to the wall. The locknut includes circumferentially spaced raised flat surface portions adapted to be engaged by a tightening tool for rotatably tightening the locknut to the hub. The raised spaced surface portions define slots therebetween having tapered sidewalls which are adapted to be engaged by the blade of a screwdriver for rotatably tightening the locknut to the hub by impacting the screwdriver with a hammer.

10 Claims, 2 Drawing Sheets

HUB LOCKNUT

FIELD OF INVENTION

The present invention relates generally to an electrical connector for securement to the wall of an electrical enclosure, and more particularly, the present invention relates to an electrical connector including a hub and a hub locknut which easily secures the hub to the enclosure wall.

BACKGROUND OF THE INVENTION

It has long been known to use electrical connectors to run electrical conduit or cable into an electrical enclosure such as a junction box. These connectors typically include a hub which is positioned in an opening in the wall of the electrical enclosure from one side thereof. The hub is secured to the enclosure by use of a hub locknut, which is attached to the hub from the other side of the enclosure. Electrical conduit terminated by the hub permits passage of electrical wire from one side of the enclosure to the other.

Quite often, these hubs are used to provide a weatherproof seal between the hub and the wall of the enclosure. For such purposes, an elastomeric sealing ring may be positioned between the hub and the enclosure. When the locknut is tightened to the hub on the other side of the enclosure, the sealing ring is forced against the enclosure wall, effecting a seal thereat.

In order to maintain an effective seal between the hub and the enclosure wall, the O-ring must be tightly compressed against the wall. Therefore, it is important that the locknut be securely and tightly retained on the hub. A tight connection between the locknut and the hub is accomplished by use of suitable gripping tools, such as pliers or wrenches. As is well known in the art, the hub and the locknut may include wrench flats thereon to permit gripping by the appropriate tool.

In certain situations, installers have resorted to the use of a screwdriver to achieve a tighter connection. The flat blade of the screwdriver is inserted in the slot between the wrench flats. The screwdriver is then struck by a hammer to "snug up" or further tighten the locknut to the hub. This provides a further degree of tightness, assuring that the O-ring maintains a weatherproof seal against the enclosure.

However, when employing this technique, it is often difficult for the installer to hold the screwdriver in the slot between the wrench flats while striking it with a hammer. In most situations, the screwdriver must be held close to the enclosure wall, rendering striking with a hammer difficult. Also, the position of the slot between the wrench flats may be such that it is relatively inaccessible to tightening in this manner.

It is, therefore, desirable to provide an improved hub locknut, which securely supports the hub against the wall of an electrical enclosure and which is constructed to facilitate the use of a screwdriver and hammer to tightly secure the locknut to the hub.

SUMMARY OF THE INVENTION

It is, therefore, an object of the present invention to provide an electrical connector for securement to the wall of an enclosure, including a hub and a hub locknut which may be tightened thereto to provide a weatherproof seal against the enclosure.

It is a further object of the present invention to provide a hub locknut, which easily facilitates the use of a screwdriver and hammer to secure the locknut to the hub.

It is a still further object of the present invention to provide a hub locknut, which is easily accessible with the blade of a screwdriver at various positions.

In the efficient attainment of these and other objects, the present invention provides an electrical connector for securement to a wall of an electrical enclosure. The connector includes a connector hub having a conduit receiving end, a conductor egressing end and an internal passage therethrough. A hub locknut is configured to attach to the conductor egressing end of the hub to secure the hub to the wall of the enclosure. The locknut includes spaced raised flat portions adapted to be engaged by a tightening tool for tightening the lock nut to the hub. The raised spaced flat portions define slots therebetween. The slots have tapered sidewalls, which are adapted to be engaged by the end of a screwdriver at an angle with respect to the wall of the enclosure so as to easily permit the screwdriver to be struck with a hammer to tighten the locknut to the hub.

In the preferred embodiment, the walls of the slot extend at an angle of 10° with respect to an axis perpendicular to the wall of the enclosure so that the end of the screwdriver which is struck by the hammer is angled away from the wall of the enclosure.

DETAILED DESCRIPTION OF THE PREFERRED EMBODIMENT

Figure 1:
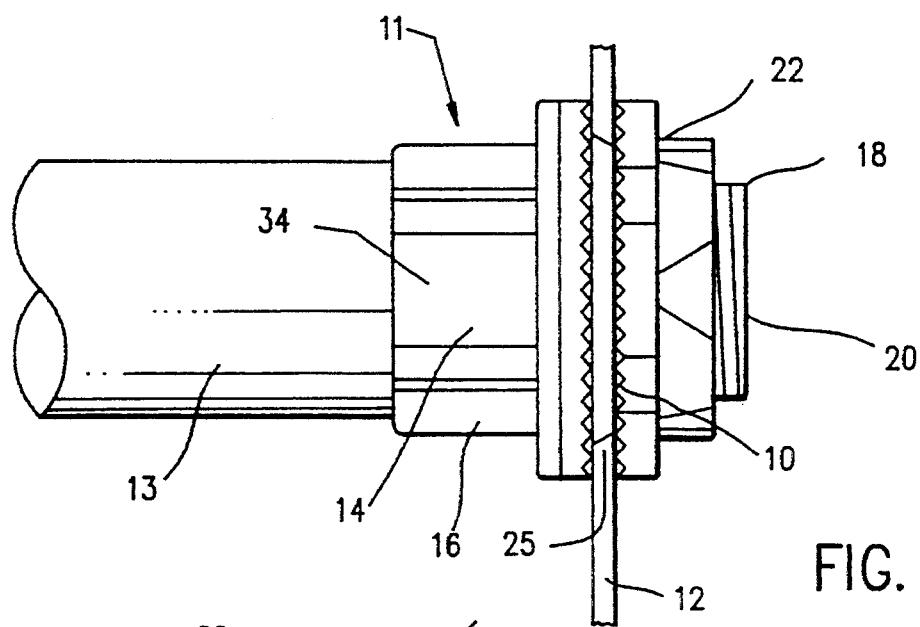
FIG. 1 is a side view of the connector of the present invention attached to a wall of an electrical enclosure.

Referring to the drawings of the present invention, an electrical panel or junction box typically has an opening 10 through a panel wall 12 to permit the ingress and egress of electrical cable (not shown) through a conduit 13. In order to terminate the conduit 13, a connector 11 is employed. Connector 11 includes a hub 14 and a hub locknut 22 disposed on opposite sides of panel wall 12.

Hub 14 is an elongate hollow generally cylindrical member formed of conductive metal having a conduit receiving end, an opposed conductor egressing end 18 and a hollow cylindrical internal bore 20 between ends 16 and 18, which permits passage of the cable therethrough. Egressing end 18 of hub 14 is dimensioned to be inserted through opening 10 of panel wall 12. Egressing end 18 is externally threaded for connection purposes.

As is known in the connector art, hub 14 may support an elastomeric sealing ring 25 between the hub 14 and panel wall 12 to effect a weatherproof seal therebetween. In order to secure hub 14 to panel wall 12, a hub locknut 22 is employed.

Hub locknut 22 is a generally annular member which is internally threaded so it may be attached to the egressing end 18 of hub 14. Hub 14 is inserted through opening 10 from one side of panel wall 12, and locknut 22 is attached to hub 14 from the other side of panel wall 12. Tightening of locknut 22 to egressing end 18 of hub 14 tightly secures hub 14 to panel wall 12 and sealing ring 25 therebetween in weather-tight relation.

The securement of locknut 22 to hub 14 is typically achieved in a manner set forth with reference to FIG. 3. Hub 14 and locknut 22 may be grasped by conventional tightening tools such as wrench 30 and pliers 32 and rotated in opposite directions to screw-tighten locknut 22 to hub 14 with panel wall 12 (FIG. 1) therebetween.

In a manner well-known in the art, both the hub 14 and locknut 22 may be provided with wrench flats shown as raised surfaces 34 on hub 14 and 36 on locknut 22. These raised surfaces 34, 36 provide flat areas which may be grasped by the wrench 30 or the pliers 32 in conventional fashion. Also, as is shown in FIG. 3, the pliers 32 may grab either side of the raised surface 36 of locknut 22 to provide additional leverage.

Figure 2:
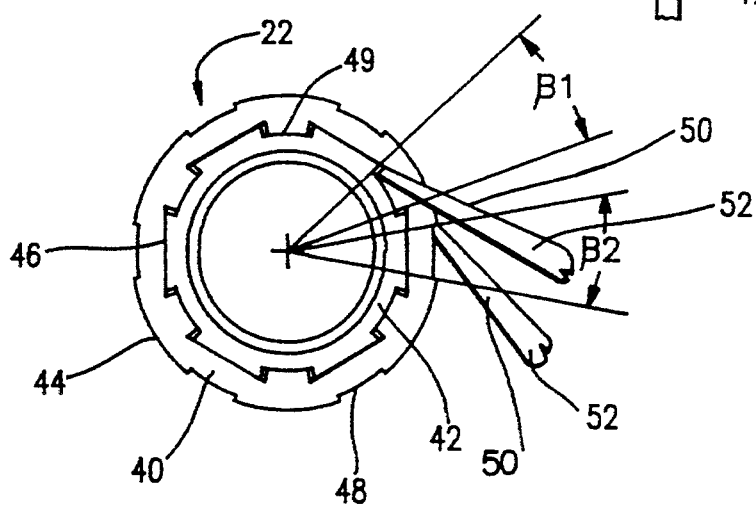
FIG. 2 is a front-plan view of the improved hub locknut of the present invention shown engaged by the blade of a screwdriver at two locations.
Figure 4:
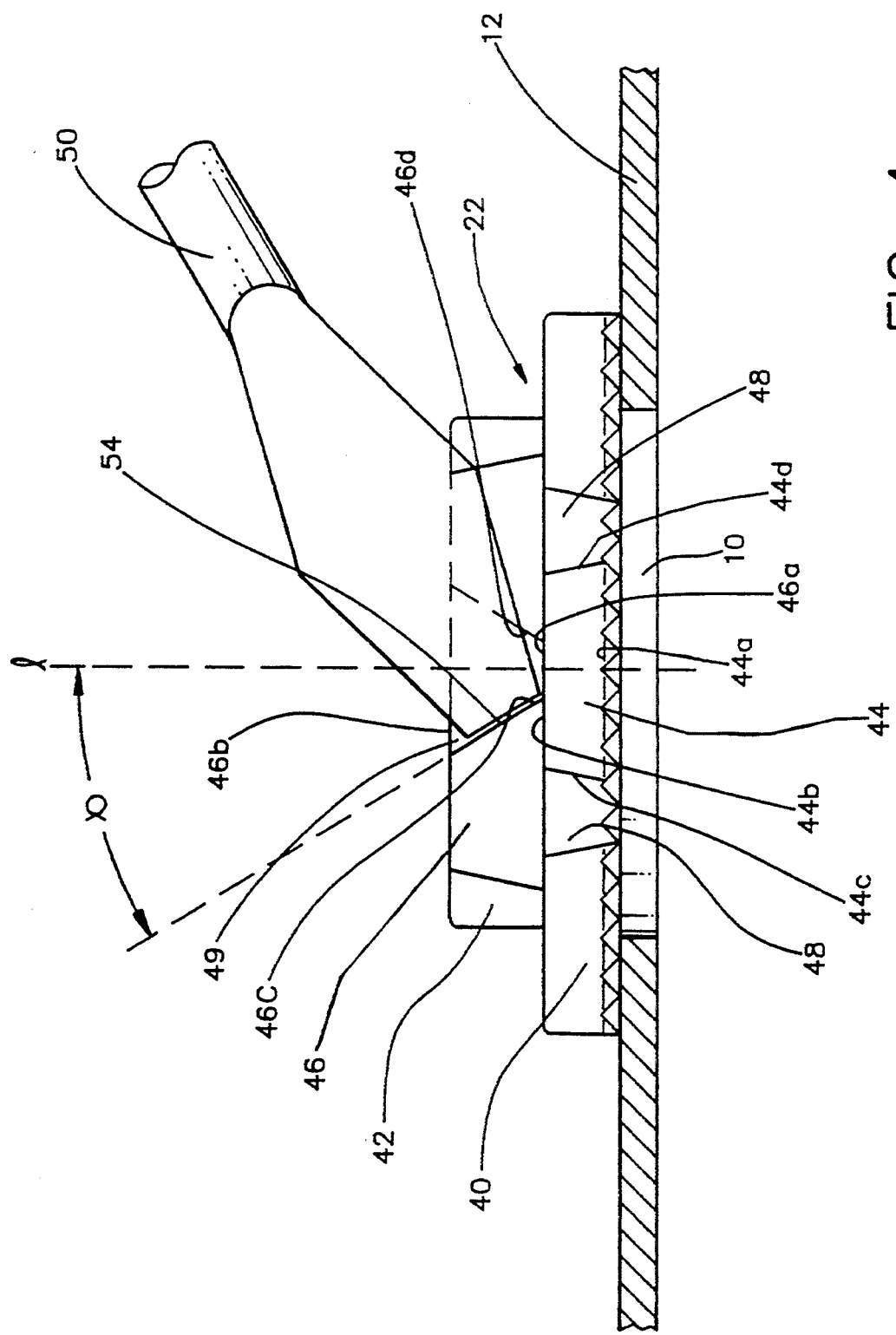
FIG. 4 is a side-plan view of a further embodiment of the improved hub locknut of FIG. 2, showing the engagement of the blade of a screwdriver.

As seen in FIG. 2, the improved locknut 22 of the present invention may be further described. Locknut 22 includes a first circumferential gripping surface 40 for positioning proximate to panel wall 12 (FIG. 4). A second circumferential gripping surface 42 is positioned axially adjacent to first gripping surface 40 and is concentric therewith. Second gripping surface 42 has a smaller outer diameter than first gripping surface 40.

Referring to FIG. 4, where a further embodiment of locknut 22 is shown in more detail, each gripping surface 40, 42 has a plurality of circumferentially spaced raised gripping surfaces 44 and 46 respectively. Raised surfaces 44, as shown in FIG. 4, are generally trapezoidal in shape, having a longer parallel side 44a adjacent panel wall 12 and a shorter parallel side 44b opposite therefrom. Nonparallel sidewalls 44c and 44d further define the trapezoidal shape. The area between adjacent raised surfaces 44 defines slots 48, which are similarly trapezoidal in shape but inverted from the shape of raised surface 44.

In the embodiment of FIG. 4, raised surfaces 46 of second gripping surface 42 are substantially similar to raised surface 44 of first gripping surface 40. Raised surfaces 46 are trapezoidal in shape having corresponding parallel sides 46a, 46b and non-parallel sides 46c and 46d. Also, raised surfaces 46 define similarly inverted trapezoidal shaped slots 49 therebetween. The construction and arrangement of surfaces 44 and 46 and slots 48 and 49 provide an additional method of tightening locknut 22 to hub 14.

As shown in FIGS. 2 and 4, a screwdriver 50 may be used to tighten locknut 22 to hub 14. Screwdriver 50 is of conventional construction having a longitudinal shaft 52 and a flat blade end 54 perpendicular to the longitudinal shaft. In order to tighten locknut 22 to hub 14, the screwdriver 50 may be placed against either raised surfaces 44 or 46.

With reference to FIG. 4, screwdriver blade 54 is shown positioned within slot 49 of second gripping surface 42. The flat blade 54 engages non-parallel sidewall 46c within slot 49. The handle end of the screwdriver 50 (not shown) may be struck with a hammer (also not shown) to tighten locknut 22 onto hub 14.

To facilitate the handling of the screwdriver 50 and the hammer, non-parallel sidewalls of raised surfaces 44 and 46 permit the screwdriver to extend away from panel wall 12 at an substantial angle therefrom. This permits ample access for the installer's hand for gripping screwdriver 50 and for manipulation of the hammer without the panel wall 12 interfering therewith.

While the angle $\alpha$ of sidewalls 44c, 44d, and 46c, 46d, may be varied. It has been found that an angle of approximately 10° from the longitudinal axis 1 (which is perpendicular to panel wall 12 and therefore perpendicular to non-parallel sidewalls 44c, 44d, and 46c, 46d) is preferred. A substantially lesser angle will result in screwdriver 50 being too close to the panel wall 12, while a substantially greater angle would provide a too steep of a surface thereby more easily allowing the blade 54 of screwdriver 50 to slip out of the slots upon impact by the hammer.

In addition, the slots 48 and 49 defined respectively between raised surfaces 44 and 46 are positioned such that they are more readily and easily accessible when the locknut 22 is positioned on the hub 14.

As shown in FIGS. 2 and 4, slots 49 are positioned between slots 48. Thus the slots 48 of the first gripping surface 40 are immediately adjacent raised surfaces 46 of second gripping surface 42. A similar relationship exists between slots 49 and raised surfaces 44.

As particularly shown in FIG. 2, the angle $\beta_1$ subtended by slot 49 of second gripping surface 42 is spaced from the angle $\beta_2$ subtended by the next adjacent slot 48 of first gripping surface 40. This relationship of the slots of first gripping surface 40 and second gripping surface 42 provides plural closely circumferentially spaced positions at which screwdriver 50 may be held against locknut 22. Thus, where the hub 14 is to be installed in a location which is difficult to access, the additional surfaces for screwdriver 50 may be helpful to the installer.

Figure 3:
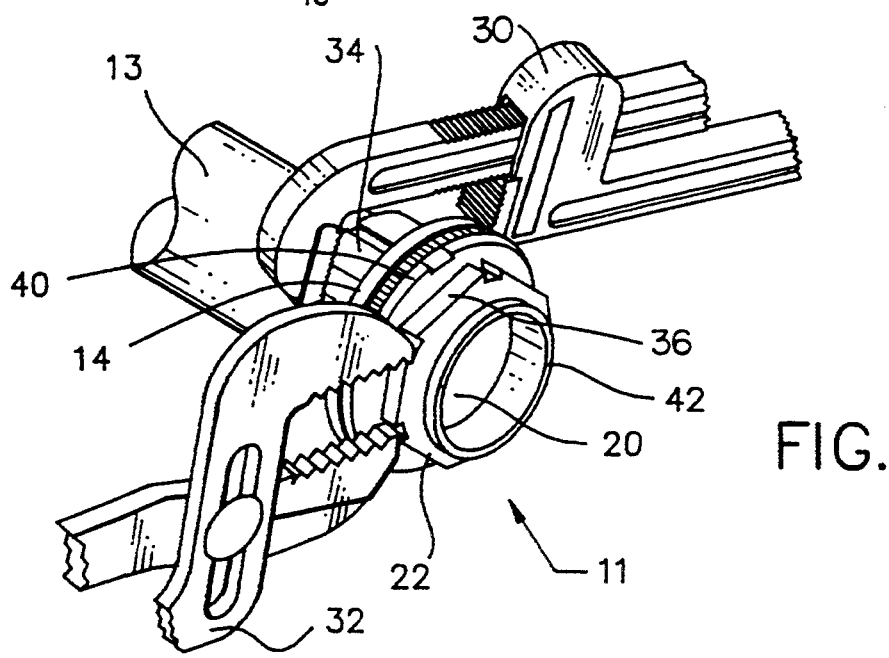
FIGS. 3 is a perspective showing of the connector of the present invention being gripped by a pair of gripping tools.

In preferred construction shown in FIGS. 1-3, for manufacturing expediency, raised surfaces having tapered sidewalls are provided only on gripping surfaces 42. The sidewalls of the raised surfaces of gripping surface 40 are formed to be substantially parallel. However, as shown in FIG. 4, it is contemplated that locknut 22 may include tapered raised surfaces 44 and 46 on both gripping surfaces 40 and 42, respectively.

Various changes to the foregoing described and shown structures would now be evident to those skilled in the art. Accordingly, the particularly disclosed scope of the invention is set forth in the following claims.

We claim:

1. An electrical conductor conduit connector comprising:
   an elongate generally cylindrical hub having a conduit receiving end, a conductor egressing end and an internal passage therethrough; and
   a hub locknut having a generally annular configuration rotatably securable to said conductor egressing end of said hub;
   said locknut having circumferentially spaced raised flat surface portions adapted to be engaged by a tightening tool for rotatably tightening said locknut to said hub;
   each of said raised spaced surface portions being generally in the shape of a trapezoid having spaced parallel end walls and tapered sidewalls, selected of said tapered sidewalls each lying in a plane disposed at an angle with respect to the longitudinal axis of said connector and adapted to be engaged by an end of a screwdriver for rotatably tightening said hub nut to said hub.

2. A conduit connector of claim 1 wherein said tapered sidewalls of said surface portions extend at an angle of approximately 10° from a line perpendicular to one of said parallel end walls.

3. A conduit connector of claim 2 wherein said locknut is internally threaded and said conductor egressing end of said hub is externally threaded to permit connection of said locknut to said hub.

4. An electrical conductor conduit connector for securing said conduit to a wall of an electrical enclosure comprising:
- an elongate axially extending generally cylindrical hub having a conduit accommodating end, a conductor egressing end and an internal bore therethrough, said conductor egressing end being adapted for insertion in an opening of said wall through one side thereof; and
- an axially extending annular locknut for positioning on the other side of said wall and rotatably attachable to said conductor egressing end of said hub to secure said hub to said wall;
- said locknut including first and second axially offset radially spaced concentric circumferential gripping surfaces engagable by a gripping tool for rotatably securing said locknut to said conductor egressing end of said hub;
- one of said circumferential gripping surface including plural axially extending slots having slot sidewalls disposed at first angle with respect to the longitudinal axis of said connector.

5. A conduit connector of claim 4 wherein said gripping surface includes a plurality of spaced flat surface portions, adjacent surface portions being separated by said slots, said spaced flat surface portions being trapezoidal in shape having a pair of parallel sides, the wider side being proximate to said hub, and non-parallel side being defined by said slots sidewalls.

6. A conduit connector of claim 5 wherein said one circumferential gripping surface is positioned adjacent said hub and the other circumferential gripping surface is spaced therefrom.

7. A conduit connector of claim 6 wherein said other circumferential gripping surface includes plural axially extending slots having slot sidewalls disposed at a second angle with respect to the longitudinal axis of said connector.

8. A conduit connector of claim 7 wherein the angle subtended by each slot of said one circumferential gripping surface is offset from the angle subtended by each slot of said other circumferential gripping surface.

9. A conduit connector of claim 4 wherein said first angle is approximately 10°.

10. A conduit connector of claim 7 wherein said second angle is approximately 10°.

* * * * *